(12) United States Patent
Shr et al.

(10) Patent No.: US 11,625,344 B2
(45) Date of Patent: Apr. 11, 2023

(54) TRANSMISSION CONTROL CIRCUIT, DATA TRANSMISSION SYSTEM USING DIFFERENT DATA FORMATS, AND OPERATING METHOD THEREOF

(71) Applicant: Realtek Semiconductor Corp., HsinChu (TW)

(72) Inventors: Kai-Ting Shr, HsinChu (TW); Kuan-Hsing Lu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 84 days.

(21) Appl. No.: 17/338,705

(22) Filed: Jun. 4, 2021

(65) Prior Publication Data
US 2022/0109738 A1 Apr. 7, 2022

(30) Foreign Application Priority Data
Oct. 7, 2020 (TW) .................................. 109134724

(51) Int. Cl.
  G06F 13/38 (2006.01)
  G06F 13/16 (2006.01)
(52) U.S. Cl.
  CPC ................................ G06F 13/1668 (2013.01)
(58) Field of Classification Search
  None
  See application file for complete search history.

(56) References Cited

U.S. PATENT DOCUMENTS

| | | | | |
|---|---|---|---|---|
| 7,443,886 B1* | 10/2008 | Gross | .................... | G06F 13/385 370/476 |
| 7,523,243 B2* | 4/2009 | Bohm | ................... | G06F 13/385 710/110 |
| 11,442,844 B1* | 9/2022 | Peattie | ................ | G06F 11/0751 |
| 2004/0107169 A1* | 6/2004 | Lowe | ..................... | G06F 16/40 707/999.009 |
| 2004/0168001 A1* | 8/2004 | Szabelski | ............ | G06F 13/4045 710/62 |
| 2006/0059293 A1* | 3/2006 | Wurzburg | ........... | G06F 13/4022 710/313 |
| 2006/0179144 A1* | 8/2006 | Nagase | ................. | G06F 13/387 710/62 |
| 2008/0005262 A1* | 1/2008 | Wurzburg | ........... | G06F 13/4022 709/217 |
| 2009/0239657 A1* | 9/2009 | Ryan | .................. | G07F 17/3244 463/30 |

(Continued)

FOREIGN PATENT DOCUMENTS

TW 202022622 A 6/2020

*Primary Examiner* — Hyun Nam
(74) *Attorney, Agent, or Firm* — Winston Hsu

(57) ABSTRACT

A data transmission system has a master circuit, a slave circuit, and a transmission control circuit. The slave circuit stores a plurality of data in a first format. The master circuit processes data in a second format to perform a corresponding function. The transmission control circuit is coupled to the master circuit and the slave circuit. The transmission control circuit accesses a first datum from the slave circuit according to a first access command of the master circuit, converts the first datum in the first format into a first application datum in the second format, and transmits the first application datum to the master circuit.

18 Claims, 2 Drawing Sheets

(56) References Cited

U.S. PATENT DOCUMENTS

| | | | |
|---|---|---|---|
| 2010/0312943 A1* | 12/2010 | Uehara | G06F 13/387 |
| | | | 710/316 |
| 2013/0090159 A1* | 4/2013 | Ryan | G07F 17/3244 |
| | | | 463/25 |
| 2014/0250239 A1* | 9/2014 | Lambert | H04L 45/56 |
| | | | 709/242 |
| 2022/0109738 A1* | 4/2022 | Shr | H04L 67/565 |
| 2022/0276975 A1* | 9/2022 | Lee | G06F 13/4295 |
| 2022/0322647 A1* | 10/2022 | Lauth | A01K 67/0334 |

* cited by examiner

TRANSMISSION CONTROL CIRCUIT, DATA TRANSMISSION SYSTEM USING DIFFERENT DATA FORMATS, AND OPERATING METHOD THEREOF

BACKGROUND OF THE INVENTION

1. Field of the Invention

The present invention relates to a transmission control circuit, and more particularly to a transmission control circuit capable of data transmission and format conversion between a master circuit and a slave circuit.

2. Description of the Prior Art

In order to effectively use system resources, circuits with different functions often share the same storage device. In this case, in order to allow circuits with different functions to access data in the same storage device, a data interconnect circuit is often set between the functional circuit and the storage device. The data interconnect circuit can receive commands from different functional circuits, and sequentially read or write corresponding data from the storage device. In this way, the procedure for the functional circuit to access the storage device would be simplified.

However, when the shared storage device has more functional circuits, the amount of transmitted data will significantly affect the transmission performance of the system. In order to reduce the amount of transmitted data, the existing technology often compresses and decompresses the transmitted data. However, the compression formats used by different functional circuits may be different. Therefore, in order to ensure that the required data can be decompressed correctly, each functional circuit must be equipped with a plurality of conversion circuits for various compression formats. As a result, not only the functional circuit becomes complicated, but the area required by the functional circuit is also increased.

SUMMARY OF THE INVENTION

An embodiment of the present invention provides a data transmission system. The data transmission system comprises a slave circuit, a master circuit, and a transmission control circuit.

The slave circuit stores a plurality of data in the first format. The master circuit processes the data in a second format to complete the application function. The transmission control circuit is coupled to the slave circuit and the master circuit. The transmission control circuit accesses a corresponding datum from the slave circuit according to an access command of the master circuit, converts the datum in the first format into application datum in the second format, and returns the application datum to the master circuit.

Another embodiment of the present invention provides a method of operating a data transmission system. The data transmission system comprises a slave circuit, a master circuit and a transmission control circuit.

The method of operating the data transmission system comprises the slave circuit storing a plurality of data in a first format, the master circuit transmitting an access command to the transmission control circuit, the transmission control circuit accessing a datum from the slave circuit according to the access command, the transmission control circuit converting the datum in the first format into an application datum in a second format, the transmission control circuit returning the application datum to the master circuit, and the master circuit processing the first application datum to complete an application function.

Another embodiment of the present invention provides a transmission control circuit. The transmission control circuit is coupled to the master circuit and the slave circuit. The slave circuit stores a plurality of data in the first format, and the transmission control circuit returns an application datum in the second format according to the command of the master circuit so that the master circuit completes an application function.

The transmission control circuit comprises an addressing unit, a format conversion unit, and a cropping control unit. The addressing unit generates control information according to address information and data length information included in the access command. The format conversion unit converts data in the first format into data in the second format. The cropping control unit is coupled to the format conversion unit, transmits a datum in the first format obtained from the slave circuit to the format conversion unit according to the control information so that the format conversion unit converts format of the datum to generate a conversion datum, and crops the conversion datum according to the control information to generate an application datum.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
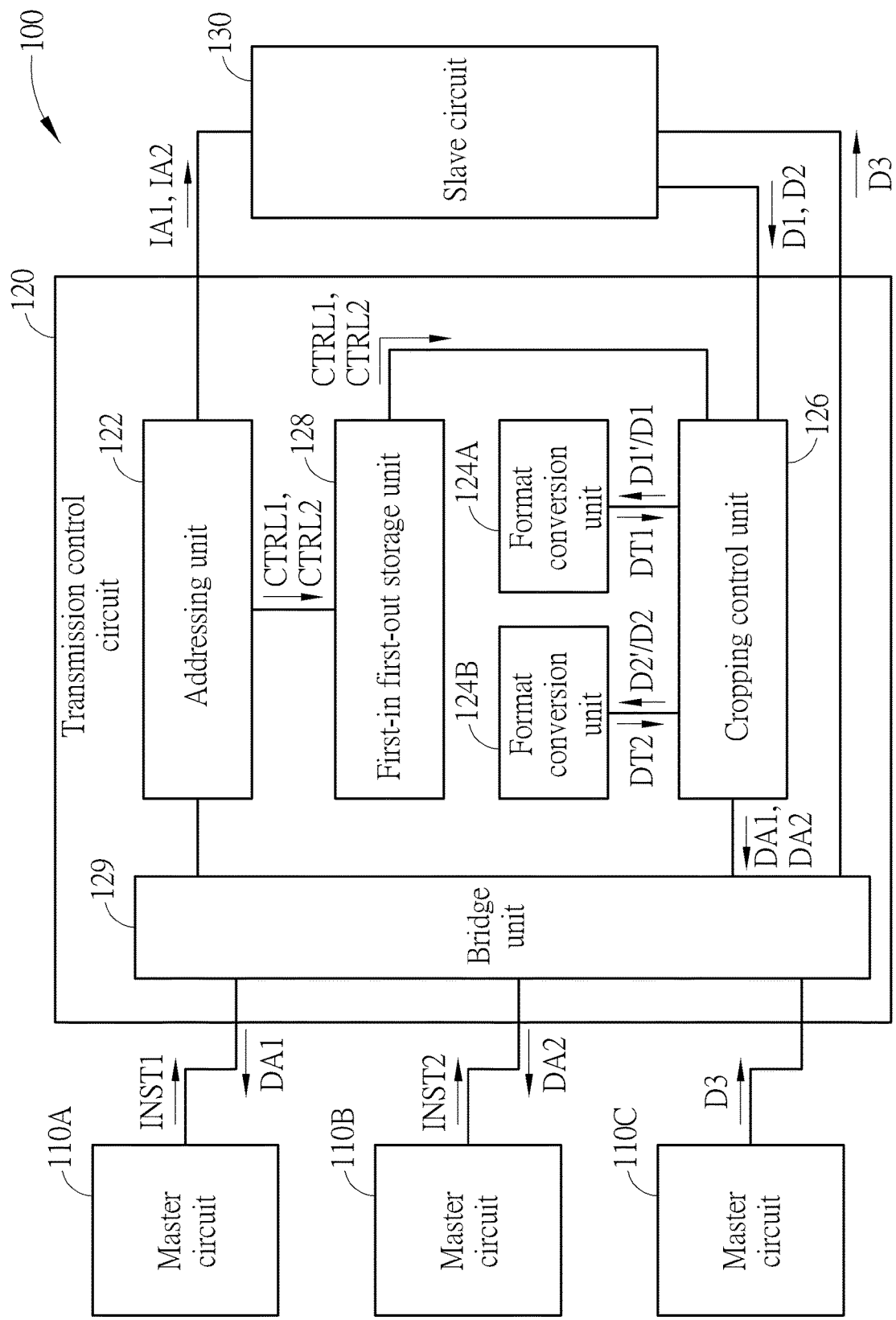
FIG. 1 is a schematic diagram of a data transmission system according to an embodiment of the present invention.

FIG. 1 is a schematic diagram of a data transmission system 100 according to an embodiment of the present invention. The data transmission system 100 may comprise a master circuit 110A, a transmission control circuit 120 and a slave circuit 130. In some embodiments, the master circuit 110A may be, for example, but not limited to, a direct memory access (DMA) control unit, an image processing unit, a graphics processing unit (GPU) or a central processing unit (CPU). The slave circuit 130 may be a memory, for example, but not limited to a double data rate (DDR) memory or a double data rate synchronous dynamic random access memory (DDR SDRAM).

The slave circuit 130 can store a plurality of data. In some embodiments, in order to effectively utilize the storage space in the slave circuit 130, the data transmission system 100 may firstly compress the data to be written into the slave circuit 130 in a first format. That is, the data stored in the slave circuit 130 may have the first format.

However, in the embodiment of FIG. 1, the master circuit 110A completes the application functions by processing data in a second format. In other words, the master circuit 110A may not be able to directly process compressed data in the first format stored in the slave circuit 130. In this case, when the master circuit 110A wants to read data from the slave circuit 130, the master circuit 110A can send a first access command INST1 to the transmission control circuit 120. The transmission control circuit 120 would access a corresponding first datum D1 from the slave circuit 130 according to the first access command INST1, convert the first datum D1 in the first format into a first application datum DA1 in the second format, and return the first application datum DA1 to the master circuit 110A.

In this way, the master circuit 110A does not need to be provided with a format conversion unit, and would obtain data in the second format via the transmission control circuit 120. In some embodiments, the data transmission system 100 may further comprise more master circuits, and the transmission control circuit 120 may convert the data in the first format into a format required by each master circuit.

For example, the data transmission system 100 may further comprise a master circuit 110B. The master circuit 110B is coupled to the transmission control circuit 120, and the master circuit 110B processes data in a third format to complete its application functions. In this embodiment, the transmission control circuit 120 would access a corresponding second datum D2 from the slave circuit 130 according to an access command INST2 of the master circuit 110B, and convert the second datum D2 in the first format into a second application datum DA2 in the third format, and return the second application datum DA2 to the master circuit 110B.

Since the transmission control circuit 120 would convert the data in the first format into the data in the second format or the data in the third format according to the access commands of the master circuits 110A and 110B, the master circuits 110A and 110B do not need a format conversion unit, and the design of the master circuits 110A and 110B would be simplified.

In FIG. 1, the transmission control circuit 120 may comprise an addressing unit 122, format conversion units 124A and 124B, and a cropping control unit 126. The addressing unit 122 would determine the addresses of the data and the formats to be converted according to the commands from the master circuits 110A and 110B. In some embodiments, the cropping control unit 126 may be coupled to the format conversion units 124A and 124B. According to the format conversion information determined by the addressing unit 122, the cropping control unit 126 would send the data obtained from the slave circuit 130 to the format conversion unit 124A and convert the data in the first format into the data in the second format, or send the data obtained from the slave circuit 130 to the format conversion unit 124B and convert the data in the first format into the data in the third format.

For example, when the master circuit 110A wants to obtain the first application datum DA1 from the slave circuit 130, the master circuit 110A may send the first access command INST1 to the transmission control circuit 120. In some embodiments, the first access command INST1 may comprise address information and data length information of the first application datum DA1. Since the master circuits 110A and 110B use different address ranges, it is possible to determine the current data format required by the master circuit according to the address information recorded in the first access command INST1. In this case, the addressing unit 122 would generate corresponding first control information CTRL1 according to the first access command INST1. The first control information CTRL1 may record the format to be converted so that the transmission control circuit 120 would select the corresponding format conversion unit 124A or 124B to convert the data format after the first datum D1 is obtained. However, the present invention is not limited to use the address ranges to determine the data format to be converted. In some other embodiments, the transmission control circuit 120 may also determine the data format to be converted based on the master circuit that transmits the access command. For example, the transmission control circuit 120 would select the format conversion unit 124A to convert the data format when the access command is received from the master circuit 110A, and the transmission control circuit 120 would select the format conversion unit 124B to convert the data format when the access command is received from the master circuit 110B.

In addition, since the master circuit 110A designs its addressing rules based on the data in the second format, and the slave circuit 130 designs its addressing rules based on the data in the first format, there may be differences between the master circuit 110A and the slave circuit 130. For example, the data compressed in the first format may be in the unit of 16-bit, and the data compressed in the second format may be in the unit of 10-bit. In this case, if the first access command INST1 sent by the master circuit 110A corresponds to the first application datum DA1 in the second format, it may not be possible to directly correspond to the data stored in the first format in the slave circuit 130 according the same addressing rules. In this case, the addressing unit 122 performs conversion based on the difference between the second format and the first format to obtain the address and data length of the first datum D1 from the slave circuit 130 (the first datum D1 actually contains the first application datum DA1).

In this way, the transmission control circuit 120 would send a read command IA1 to the slave circuit 130 to access the first datum D1 from the slave circuit 130. Then, the cropping control unit 126 would recognize that the first datum D1 should be converted into the second format according to the first control information CTRL1, so the first datum D1 would be sent to the format conversion unit 124A, and the format conversion unit 124A would convert the format of the first datum D1 to generate the first conversion datum DT1. Since the first conversion datum DT1 may comprise data other than the first application datum DA1, the cropping control unit 126 may also crop the first conversion datum DT1 according to the data length recorded in the first control information CTRL1 to obtain the first application datum DA1 required by the master circuit 110A.

Similarly, when the master circuit 110B wants to access the second application datum DA2 from the slave circuit 130, the master circuit 110B would send the second access command INST2 to the transmission control circuit 120. The addressing unit 122 would generate corresponding second control information CTRL2 according to the address information and the data length information contained in the second access command INST2, and would perform conversion according to the difference between the third format and the first format to obtain the address and data length of the second datum D2 from the slave circuit 130 (the second datum D2 actually contains the second application datum DA2). Then, the transmission control circuit 120 would send a read command IA2 to the slave circuit 130. After accessing the second datum D2 from the slave circuit 130, the cropping control unit 126 would send the second datum D2 to the format conversion unit 124B according to the second control information CTRL2 so that the format conversion unit 124B converts the format of the second datum D2 to generate the second conversion datum DT2, and then the cropping control unit 126 would crop the second conversion datum DT2 according to the second control information CTRL2 to generate the second application datum DA2.

In some embodiments, the transmission control circuit 120 may further comprise a first-in first-out storage (FIFO) unit 128, and the addressing unit 122 may store the first control information CTRL1 and the second control information CTRL2 in the first-in-first-out storage unit 128. Accordingly, the transmission control circuit 120 would sequentially process the access commands from the master circuits 110A and 110B, and perform corresponding processing after the slave circuit 130 reads the first datum D1 and the second datum D2.

In addition, in some embodiments, when the slave circuit 130 stores data, the slave circuit 130 may add bits to the stored data for a classification or management purpose. That is, the first datum D1 and the second datum D2 stored in the slave circuit 130 may comprise redundant bits. In this case, the cropping control unit 126 may crop the redundant bits from the first datum D1 to generate a first cropped datum D1' and send the first cropped datum D1' to the format conversion unit 124A so that the format conversion unit 124A would generate the first conversion datum DT1 based on the first cropped datum D1'. The cropping control unit 126 may crop the redundant bits from the second datum D2 to generate a second cropped datum D2' and send the second cropped datum D2' to the format conversion unit 124B so that the format conversion unit 124B would generate the second conversion datum DT2 based on the second cropped datum D2'.

Furthermore, in FIG. 1, the data transmission system 100 may further comprise a master circuit 110C. The master circuit 110C is coupled to the transmission control circuit 120 and may write a datum D3 in the first format to the slave circuit 130 via the transmission control circuit 120. In other words, the transmission control circuit 120 would not only assist the master circuits 110A, 110B, and 110C to read data from the slave circuit 130, but also assist the master circuits 110A, 110B, and 110C to write data to the slave circuit 130. In the embodiment of FIG. 1, the slave circuit 130 only stores data in the same format. However, in some embodiments, the slave circuit 130 may store data in two or more different formats, and the transmission control circuit 120 may be provided with corresponding format conversion units. In this way, the master circuits 110A, 110B, and 110C may obtain data in different formats from the slave circuit 130 via the transmission control circuit 120, and convert the data into the required format. Therefore, there is no need to repeatedly set various format conversion units in the master circuits 110A, 110B, and 110C, which increases the complexity of the design.

In addition, in FIG. 1, the transmission control circuit 120 may further comprise a bridge unit 129. The bridge unit 129 is coupled to the master circuits 110A, 110B, and 110C, the addressing unit 122 and the cropping control unit 126. The bridge unit 129 would manage the data transmission between the transmission control circuit 120 and the master circuits 110A, 110B, and 110C. For example, the bridge unit 129 may sequentially transmit the commands from the master circuits 110A, 110B, and 110C to the addressing unit 122 to avoid conflicts caused by simultaneous transmission of commands of the master circuits. Furthermore, the bridge unit 129 would also record the master circuit corresponding to each application datum to ensure that the transmission control circuit 120 would return the first application datum DA1 to the master circuit 110A, and return the second application datum DA2 to the master circuit 110B.

Although in the foregoing embodiments, the transmission control circuit 120 may comprise the addressing unit 122, the format conversion units 124A and 124B, the cropping control unit 126, the first-in first-out storage unit 128, and the bridge unit 129, but the invention is not limited thereto. For example, in some embodiments, some units of the transmission control circuit 120 may be integrated, or may additionally comprise other units with other functions according to requirements.

Figure 2:
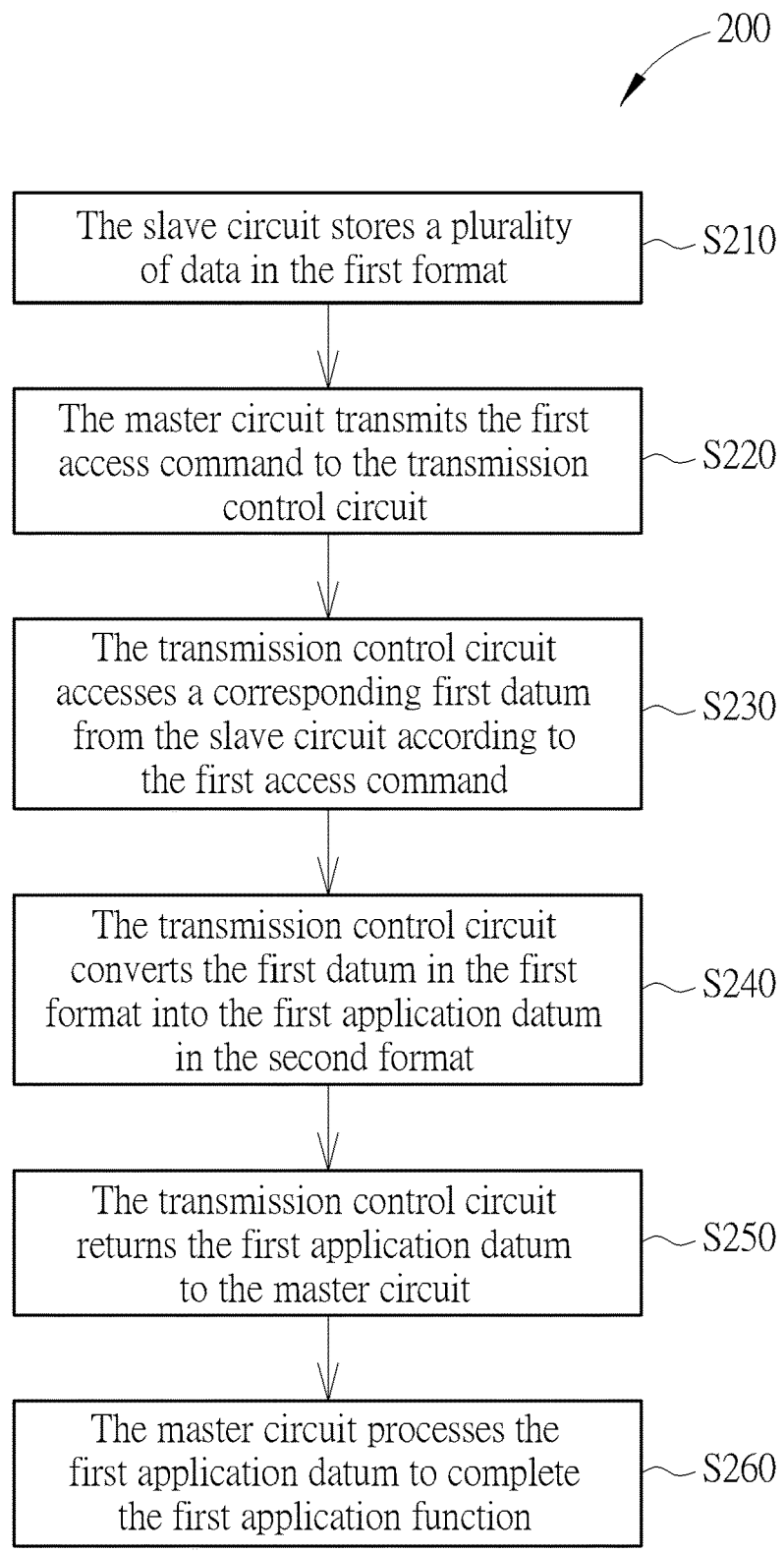
FIG. 2 is a flowchart of a method for operating the data transmission system in FIG. 1.

FIG. 2 is a flowchart of a method 200 of operating the data transmission system 100 according to an embodiment of the present invention. The method 200 may comprise steps S210 to S260. It could be understood that the steps mentioned in this implementation method could be adjusted according to actual needs. Unless the sequence of the steps is specifically stated, the sequence can be adjusted according to actual needs, and the steps could even be executed simultaneously or partially simultaneously.

S210: The slave circuit 130 stores a plurality of data in the first format;

S220: The master circuit 110A transmits the first access command INST1 to the transmission control circuit 120;

S230: The transmission control circuit 120 accesses the corresponding first datum D1 from the slave circuit 130 according to the first access command INST1;

S240: The transmission control circuit 120 converts the first datum D1 in the first format into the first application datum DA1 in the second format;

S250: The transmission control circuit 120 returns the first application datum DA1 to the master circuit 110A; and S260: The master circuit 110A processes the first application datum DA1 to complete the first application function.

In some embodiments, the first access command INST1 may comprise address information and data length information. In step S230, the addressing unit 122 of the transmission control circuit 120 may calculate an address and a data length of the first datum D1 in the slave circuit 130 according to the address information and the data length information included in the first access command INST1, so that the first datum D1 would be read from the slave circuit 130.

In addition, the addressing unit 122 may also generate the first control information CTRL1 according to the first access command INST1. In step S240, the cropping control unit 126 may transmit the first datum D1 obtained from the slave circuit 130 to the first format conversion unit 124A according to the first control information CTRL1, the first format conversion unit 124A may convert the format of the first datum D1 to generate the first conversion datum DT1, and the cropping control unit 126 may crop the first conversion datum DT1 according to the first control information CTRL1 to generate the first application datum DA1. In some embodiments, if the first datum D1 comprises redundant bits added by the storage device 130, the cropping control unit 126 may crop the redundant bits from the first datum D1 to generate the first cropped datum D1' and send the first cropped datum D1' to the format conversion unit 124A so that the format conversion unit 124A would generate the first conversion datum DT1 based on the first cropped datum D1'.

Similarly, the master circuit 110B may use steps similar to the method 200 to obtain the second datum D2 from the slave circuit 130 via the transmission control circuit 120, and convert the second datum D2 into the second application datum DA2 in the third format. Since different master circuits would obtain data in different formats from the slave circuit 130 through the transmission control circuit 120, and convert the data into required formats, there is no need to repeatedly set various format conversion units in each master circuit, and the design of the master circuits would be simplified.

In summary, the data transmission system and the method for operating the data transmission system provided by the embodiments of the present invention would set the format conversion unit in the transmission control circuit coupled between the master circuits and the slave circuit, so the master circuits would access the data stored in the slave circuit through the transmission control circuit. In this way, different master circuits would obtain data in the required formats through the transmission control circuit, and there is no need to repeatedly set various format conversion units in each master circuit, so the design of the master circuits would be simplified and hardware components would be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data transmission system, comprising:
a slave circuit configured to store a plurality of data in a first format;
a first master circuit configured to process data in a second format to complete a first application function; and
a transmission control circuit coupled to the slave circuit and the first master circuit and configured to access a first datum of the plurality of data from the slave circuit according to a first access command of the first master circuit, convert the first datum in the first format into a first application datum in the second format, and return the first application datum to the first master circuit, the transmission control circuit comprising:
an addressing unit configured to generate first control information according to address information and data length information included in the first access command;
a first format conversion unit configured to convert data in the first format into data in the second format; and
a cropping control unit coupled to the first format conversion unit and configured to transmit the first datum obtained from the slave circuit to the first format conversion unit according to the first control information so that the first format conversion unit converts format of the first datum to generate a first conversion datum, and crop the first conversion datum according to the first control information to generate the first application datum.

2. The data transmission system of claim 1 further comprising:
a second master circuit coupled to the transmission control circuit and configured to process data in a third format to complete a second application function;
wherein the transmission control circuit is further configured to access a second datum from the slave circuit according to a second access command of the second master circuit, and convert the second datum in the first format into a second application datum in the third format, and return the second application datum to the second master circuit.

3. The data transmission system of claim 2, wherein the transmission control circuit further comprises:
a second format conversion unit coupled to the cropping control unit and configured to convert data in the first format into data in the third format;
wherein:
the addressing unit is further configured to generate second control information according to address information and data length information included in the second access command; and the cropping control unit is further configured to transmit the second datum obtained from the slave circuit to the second format conversion unit according to the second control information so that the second format conversion unit converts format of the second datum to generate a second conversion datum, and crop the second conversion datum according to the second control information to generate the second application datum.

4. he data transmission system of claim 3, wherein the transmission control circuit further comprises a first-in-first-out storage unit coupled to the addressing unit and the cropping control unit and configured to store the first control information and the second control information.

5. The data transmission system of claim 1, wherein the cropping control unit is further configured to crop out redundant bits in the first datum before transmitting the first datum to the first format conversion unit.

6. The data transmission system of claim 1, wherein:
the address information and the data length information included in the first access command are respectively a corresponding address and a data length of the first application datum; and
the addressing unit is further configured to calculate an address and a data length of the first datum in the slave circuit according to the address information and the data length information included in the first access command.

7. The data transmission system of claim 1, wherein the first master circuit comprises a direct memory access (DMA) control unit, an image processing unit, a graphics processing unit (GPU) or a central processing unit (CPU).

8. The data transmission system of claim 1, wherein the slave circuit comprises a double data rate (DDR) memory.

9. The data transmission system of claim 1 further comprising:
a third master circuit coupled to the transmission control circuit and configured to write a third datum with the first format to the slave circuit through the transmission control circuit.

10. A method for operating a data transmission system, the data transmission system comprising a slave circuit, a first master circuit and a transmission control circuit, the method comprising:
the slave circuit storing a plurality of data in a first format;
the first master circuit transmitting a first access command to the transmission control circuit;
the transmission control circuit accessing a first datum from the slave circuit according to the first access command;
the transmission control circuit converting the first datum in the first format into a first application datum in a second format;
the transmission control circuit returning the first application datum to the first master circuit; and
the first master circuit processing the first application datum to complete a first application function;
wherein:
the transmission control circuit comprises an addressing unit, a first format conversion unit and a cropping control unit; and
the transmission control circuit converting the first datum in the first format into the first application datum in the second format comprises:
the addressing unit generating first control information according to address information and data length information included in the first access command;

the cropping control unit transmitting the first datum obtained from the slave circuit to the first format conversion unit according to the first control information;

the first format conversion unit converting format of the first datum to generate a first conversion datum; and the cropping control unit cropping the first conversion datum according to the first control information to generate the first application datum.

11. The method of claim 10, wherein the data transmission system further comprises a second master circuit, and the method further comprises:

the second master circuit transmitting a second access command to the transmission control circuit;

the transmission control circuit accessing a second datum from the slave circuit according to the second access command;

the transmission control circuit converting the second datum in the first format into a second application datum in a third format;

the transmission control circuit returning the second application datum to the second master circuit; and the second master circuit processing the second application datum to complete a second application function.

12. The method of claim 11, wherein:

the data transmission system further comprises a second format conversion unit; and the transmission control circuit converting the second datum in the first format into the second application datum in the third format comprises:

the addressing unit generating second control information according to address information and data length information included in the second access command; and the cropping control unit transmitting the second datum obtained from the slave circuit to the second format conversion unit according to the second control information;

the second format conversion unit converting format of the second datum to generate a second conversion datum; and the cropping control unit cropping the second conversion datum according to the second control information to generate the second application datum.

13. The method of claim 10 further comprising the cropping control unit cropping out redundant bits in the first datum before transmitting the first datum to the first format conversion unit.

14. The method of claim 10, wherein:

the address information and the data length information included in the first access command are respectively a corresponding address and a data length of the first application datum; and the transmission control circuit accessing the corresponding first datum from the slave circuit according to the first access command comprises:

the addressing unit calculating an address and a data length of the first datum in the slave circuit according to the address information and the data length information included in the first access command.

15. The method of claim 10, wherein the data transmission system further comprises a third master circuit, and the method further comprises:

the third master circuit writing a third datum with the first format to the slave circuit through the transmission control circuit.

16. A transmission control circuit, coupled to a first master circuit and a slave circuit, wherein the slave circuit is configured to store a plurality of data in a first format, and the transmission control circuit is configured to return a first application datum in a second format according to a first access command of the first master circuit to enable the first master circuit to complete a first application function, the transmission control circuit comprising:

an addressing unit configured to generate first control information according to address information and data length information included in the first access command;

a first format conversion unit configured to convert data in the first format into data in the second format; and a cropping control unit coupled to the first format conversion unit and configured to transmit a first datum in the first format obtained from the slave circuit to the first format conversion unit according to the first control information so that the first format conversion unit converts format of the first datum to generate a first conversion datum, and crop the first conversion datum according to the first control information to generate the first application datum.

17. The transmission control circuit of claim 16 further coupled to a second master circuit, and further configured to return a second application datum in a third format according to a second access command of the second master circuit to enable the second master circuit to complete a second application function, the transmission control circuit further comprising:

a second format conversion unit coupled to the cropping control unit and configured to convert data in the first format into data in the third format;

wherein:

the addressing unit is further configured to generate second control information according to address information and data length information included in the second access command; and the cropping control unit is further configured to transmit a second datum obtained from the slave circuit to the second format conversion unit according to the second control information so that the second format conversion unit converts format of the second datum to generate a second conversion datum, and crop the second conversion datum according to the second control information to generate the second application datum.

18. The transmission control circuit of claim 16, wherein:

the address information and the data length information included in the first access command are respectively a corresponding address and a data length of the first application datum; and the addressing unit is further configured to calculate an address and a data length of the first datum in the slave circuit according to the address information and the data length information included in the first access command.

* * * * *